United States Patent
Bian

(10) Patent No.: US 9,045,594 B2
(45) Date of Patent: Jun. 2, 2015

(54) METHOD FOR PREPARING HIGH SHRINKAGE RATE POLYTRIMETHYLENE TEREPHTHALATE

(75) Inventor: Shuchang Bian, Wujiang (CN)

(73) Assignee: Jiangsu Zhonglu Technology Development Co., Ltd, Wujiang, Jiangsu (CH)

( * ) Notice: Subject to any disclaimer, the term of this patent is extended or adjusted under 35 U.S.C. 154(b) by 0 days.

(21) Appl. No.: 13/579,938

(22) PCT Filed: Feb. 23, 2011

(86) PCT No.: PCT/CN2011/071202
§ 371 (c)(1),
(2), (4) Date: Aug. 19, 2012

(87) PCT Pub. No.: WO2011/131054
PCT Pub. Date: Oct. 27, 2011

(65) Prior Publication Data
US 2012/0316292 A1    Dec. 13, 2012

(30) Foreign Application Priority Data
Apr. 22, 2010   (CN) .......................... 2010 1 0155871

(51) Int. Cl.
| | | |
|---|---|---|
| C08G 63/18 | (2006.01) | |
| C08G 63/00 | (2006.01) | |
| C08G 63/02 | (2006.01) | |
| C08G 61/10 | (2006.01) | |
| C08G 63/78 | (2006.01) | |
| C08G 63/183 | (2006.01) | |
| C08G 63/82 | (2006.01) | |
| D01F 6/84 | (2006.01) | |

(52) U.S. Cl.
CPC .............. *C08G 63/78* (2013.01); *C08G 63/183* (2013.01); *C08G 63/82* (2013.01); *D01F 6/84* (2013.01)

(58) Field of Classification Search
None
See application file for complete search history.

(56) References Cited

U.S. PATENT DOCUMENTS

| | | | |
|---|---|---|---|
| 6,326,456 B2 * | 12/2001 | Kelsey et al. ................. 528/279 |
| 8,614,287 B2 | 12/2013 | Bian | |
| 2006/0084781 A1 * | 4/2006 | Kelsey et al. ................. 528/272 |
| 2006/0173155 A1 * | 8/2006 | Fujimoto et al. ........... 528/308.6 |
| 2008/0157425 A1 * | 7/2008 | Rodgers et al. ............ 264/176.1 |
| 2009/0305594 A1 * | 12/2009 | He et al. ........................ 442/400 |
| 2012/0316315 A1 | 12/2012 | Bian | |

FOREIGN PATENT DOCUMENTS

| | | |
|---|---|---|
| CN | 1350561 A | 5/2002 |
| CN | 101469060 A | 7/2009 |
| CN | 101817918 A | 9/2010 |

* cited by examiner

*Primary Examiner* — Susannah Chung
*Assistant Examiner* — Robert T Butcher
(74) *Attorney, Agent, or Firm* — Stites & Harbison PLLC; Cong Ding

(57) ABSTRACT

A method for preparing high shrinkage PTT copolyester, includes adding starting raw materials into a reaction kettle and adding an esterification catalyst to carry out esterification reaction at 220° C.-260° C. under 0.05-0.30 MPa and completing the reaction when there being no water produced; and adding polymerization catalyst into the reaction system and carrying out the polymerization reaction at 240° C.-280° C. to get polytrimethylene terephthalate. The starting raw materials consists of 1,3-propylene glycol, terephtalic acid, a third monomer, a forth monomer and a fifth monomer. Polytrimethylene terephthalate prepared by the invention shows good spinning behaviour, of which the crystallization speed is noticeably lower than that of conventional polytrimethylene terephthalate, thus, fibers made of them has high boiling water shrinkage rate and ideal shrink property.

7 Claims, No Drawings

METHOD FOR PREPARING HIGH SHRINKAGE RATE POLYTRIMETHYLENE TEREPHTHALATE

CROSS REFERENCE TO RELATED APPLICATIONS

This application is a §371 National State Application of PCT/CN2011/071202 filed Feb. 23, 2011 which claims priority to CN201010155871.2 filed Apr. 22, 2010.

FIELD OF THE INVENTION

The present invention relates to a method for preparing PTT polyester, especially a method for preparing high shrinkage PTT copolyester.

BACKGROUND OF THE INVENTION

PTT polyester is a novel aromatic polyester product of organic polymer which together with PET and PBT belongs to the same polymer series. It is prepared through esterification and polycondensation using refined terephthalic acid and 1,3-propylene glycol as the starting raw material.

Successful development of PTT has further enriched chemical fiber products series. Firstly, distinct from PET polyester which is almost linear in macromolecular conformation, molecular conformation of PTT polymer is spiral, which will allow PTT fiber to be highly "puffed" and endow its fiber with good elasticity; secondly, PTT polyester has a lower glass-transition temperature and thus apt to take low temperature phase transition, which can effectively eliminate influence on fabric by external stress, and allow its fiber and textile be dyed at a lower temperature with good dyeing properties of disperse dyes; thirdly, the Young's modulus of PTT fiber is lower. Its textile shows very soft hand feel and good bulkiness. Its fabrics possess good elastic recovery function, and thus called "Memory Fiber".

Because of above advantages, PTT polyester and its fiber are widely and fast popularized in chemical fiber field. Up to now, the following two aspects are most widely used in the market: in one aspect, parallel composite elastic fiber that has elastic function similar to polyurethane fiber and obtains very good effects with its textile having very good elastic recovery and bulky function when used in fabric substituting for polyurethane fiber is spun making use of the different shrink function of the two composition PTT and PET; in another aspect, conjugate spinning or combing with other fibers is conducted making use of the lower glass temperature and the easiness to take phase transition upon friction at normal temperature owned by its fiber, so that the flatness variation of the fabric caused by outer force will be eliminated, making the fabric easier to take care, producing effect of "one touch smooth", and fabricating so called "Memory Fabric".

Over the years, people have done a lot beneficial modification to conventional polyester PET, so that modified terylene gain a lot excellent performance and thus be widely used. Great progress has been seen in the diversity and comfort aspect. Seen from applicability aspect, PET polyester fiber among all types of human synthetic fibers is most suitable for human need and also a most widely used polyester fiber at present. Although PTT fiber possesses its unique advantages, there are still certain defects in some performance aspects. Therefore, besides to expand the application of conventional PTT fiber, modification and differentiation of PTT polyester and its fiber must be done cooperating with development of modified PET polyester fiber in order to better use features of PTT fiber.

Development of PTT polyester with high shrinkage performance and its fiber can maximize use of the good elastic recovery function, softness and high shrinkage rate owned by PTT polyester itself, providing a high quality product substituting for presently conventional high shrinkage PET polyester fiber in fabrication of high density fabric. Its fabric is characterized in high compactness, good softness, high stability, free iron and easy care. Various super soft and high density fabric with good using effects can be produced by combing use with PTT superfine fiber.

SUMMARY OF THE INVENTION

It is an object of the present invention to provide an improved method for preparing PTT polyester so as to improve the shrink performance of PTT fiber.

In order to accomplish above object, the present invention adopt the following technical scheme:

A method for preparing high shrinkage PTT copolyester, comprising following steps:

(1). Esterification reaction: add starting raw materials into a reaction kettle and add an esterification catalyst to carry out esterification reaction at 220° C.~260° C. under 0.05~0.30 MPa and complete the reaction when there being no water produced from esterification reaction, wherein, the starting raw materials consisting of 1,3-propylene glycol, terephtalic acid, a third monomer, a fourth monomer and a fifth monomer, the third monomer being selected from the group consisting of non-para aromatic dicarboxylic acid, 1,4-cyclohexane diformic acid and glutaric acid; the fourth monomer being selected from the group consisting of $C_3$-$C_{10}$ branched aliphatic dihydric alcohol, 1,4-cyclohexanedimethanol, diethylene glycol and triethyleneglycol; the fifth monomer being aliphatic polyalcohols which having carbon number between 3 and 10 and hydroxyl number per molecule is more than or equal to 3, or trimellitic anhydride, amount of the 1,3-propylene glycol, terephthalic acid, third monomer, fourth monomer and fifth monomer are such used in a molar ratio of carboxyl to hydroxyl is 1:1.16~1.85, wherein the amount of the third monomer used is 5%~10.5% of the total weight of the starting raw materials, the amount of the fourth monomer used is 0.05%~1.0% of the total weight of the starting raw materials, and the amount of the fifth monomer used is 50 ppm-600 ppm, based on the total weight of the starting raw materials;

(2). Polymerization reaction: add polymerization catalyst into the reaction system after step (1) and carry out the polymerization reaction at 240° C.~280° C. to get polytrimethylene terephthalate.

According to the present invention, the starting raw materials are reactive raw materials that take part in esterification reaction. The non-para aromatic dicarboxylic acid are aromatic dicarboxylic acid that are not pare substituted, which includes but not limited to isophthalic acid, 5-methyl-isophthalic acid, isophthalic acid-5-sodium sulfonate, phthalic acid or its acid anhydride and 2,6-naphthalenedicarboxylic acid. The branched aliphatic dihydric alcohol includes but not limited to neopentyl glycol, 1,2-butylene glycol and 2,3-butylene glycol.

According to one particular aspect of the present invention, the third monomer is isophthalic acid, and the fourth monomer is branched aliphatic dihydric alcohol.

Preferably, the fifth monomer is $C_3$-$C_{10}$ alphatic tirhydric alcohol, $C_3$-$C_{10}$ alphatic terhydric alcohol or their combination. Most preferably, the fifth monomer is selected from the group consisting of glycerin, 2-methylglycerin and pentaerythritol which is most favorable.

According to the present invention, technological conditions of esterification reaction in step (1) and the polymerization reaction in step (2) are identical with that of the traditional method for preparing PTT polyester. Wherein, esterification catalyst used in step (1) may be selected from the group consisting of titanate, $TiO_2/SiO_2$, catalyst of organic tin series and zinc acetate. The polymerization catalyst used in step (2) may be catalyst of titanium series such as titanate, polymerization catalyst of antimony series or their mixed catalyst. Combination use of titanate and polymerization catalyst of antimony series is preferred. In one particular embodiment, polymerization catalyst is a mixture of titanate and antimony acetate.

According to another aspect of the present invention, still an additive is added into the reaction system in step (2). The additive is selected from the group consisting of heat stabilizer, thermal oxidative stabilizer and toner.

Compared with prior arts, the present invention has following advantages:

1. The third monomer added in the invention can change regional chain structure of PTT macromolecular so that it becomes difficult for the chain of PTT molecule to rotate freely and approach effectively, thus reducing the effective arrangement rate of the fiber chain during spinning process, the crystallization speed of inner part of the fiber and effective crystallization rate of the fiber increasing content of amorphous region, so that content of orientation state of the fiber being increased one time during spinning and that rate of the orientation state transferring into amorphous state during subsequent process being effectively increased, leading to fibers having excellent boiling water shrinkage rate and dry hot shrinkage rate.

2. The fourth monomer added in the invention can be used as axuillary composition to adjust chain movement of PTT macromolecular, which can adjust chain movement of PTT macromolecular and effectiveness of chain rearrangement, and slow down the speed of the molecule chain entering into the crystal lattice. Very small branched chain structure can make the macromolecular chain dislocate and drift, and slow down crystallization speed. While steric hindrance is small, the relatively big variation of basic properties of macromolecule caused by addition of large amount of third monomer can be relieved.

3. The fifth monomer added in the invention forms three-dimensional connection (inter-connection) in a small scope during reaction process, producing pull-drag effect to a certain extent, which on one hand increasing steric hindrance inter macromolecule; on the other hand, pull-drag effect in a small scope is beneficial to spinning, particularly for small sized FDY type, and play an important role in improving spinning yield, and indirectly reducing crystallizing rate of fiber, 4. The PTT polyester prepared according to the invention possesses good spinnability and can be used to spin types such as microneme and filament, etc. In particular, disperse dyes easy-to-dye can be realized at normal temperature and under normal pressure with good color fastness, obtaining excellent fabric effect. In addition to high shrinkage filament, it may also be used to spin microneme having good resilience and restoring ability, gaining more significant effect when particularly used for carpet fabric manufacturing.

5. The high shrinkage fiber made of the PTT polyester prepared according to the invention not only has good shrinkage rate, but also has good compact elasticity and stress relieving effect with shape being well maintained under outer force. It can produce characteristics different from that originally modified by PET polyester when fabricating suede or other fabric of high density.

6. Excellent effect is achieved by the invention from macromolecular design angle, by carrying out molecule modification and function transplantation of chain on aspects of molecular chain structure and properties of PTT macromolecule itself. The product is endowed with high shrinkage property and has no requirement of special manufacturing equipment. Manufacturing equipment and other process parameters are the same with manufacturing equipment for conventional PTT, thus the invention is fit for popularization and application.

DETAILED DESCRIPTION OF THE PREFERRED EMBODIMENT

According to the present invention, esterification catalyst adopted by esterification reaction may be titanate, $TiO_2/SiO_2$ or complex catalyst of zinc acetate and catalyst of organic tin series. Preferably, catalyst is dissolved before its addition into the polymerization system. One of the preferable embodiments is using 1,3-propylene glycol as solvent and simultaneously using Brnsted acid like organic carboxylic acid to modulate so that the catalyst dissolves forming homogeneous catalyst solution.

According to the present invention, polymerization catalyst adopted by polymerization reaction may be those frequently used in the prior art, eg. tianate, polymerization catalyst of tin series, etc. Also catalyst of more than two kinds may be used compositely. Preferably, polymerization catalyst is also dissolved in 1,3-propylene glycol before its addition into the polymerization system.

Further, some additives are added at esterification reaction stage or into polymerization reaction system to improve characteristics of PTT polyester finally prepared and its fiber. Types of additives can be selected according to specific requirement of PTT application. Generally, adding heat stabilizer at polymerization stage is preferred.

The present invention will be further described blow in conjunction with the embodiments. However, the invention is not limited to the following embodiments.

EXAMPLE 1

A method for preparing PTT polyester, comprising following steps;

(1). Esterification reaction: 18 kg refind terephthalic acid (PTA) and 8.4 kg 1,3-propylene glycol (PDO) were added into 70 L polyester experimental device, meanwhile 360 g phthalic acid, 180 g neopentyl glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer ere added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 2

A method for preparing PTT polyester comprising following steps:

(1). Esterification reaction: 18 kg refined terephthalic acid (PTA), 8.4 kg 1,3-propylene glycol (PDO) were added into 70 L polyester experimental device, meanwhile 540 g isophthalic acid, 180 g neopentyl glycol and 2.7 g pentaerythritol were added, and prepared Esterification catalyst solution (containing effective titanium 45 ppm, effective tin 8 ppm and 10 ppm zinc acetate) was added as well, then the temperature; as elevated and pressure was increased to 0.3 MPa to carry out the esterification reaction. Esterification temperature was controlled between 220~260° C., Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 3

A method for preparing PTT polyester, comprising following steps:

(1). Esterification reaction: 18 kg refind terephthalic acid (PTA), 8.4 kg 1,3-propylene glycol (PDO) were added into 70 L polyester experimental device, meanwhile 720 g isophthalic acid, 180 g neopentyl glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 4

A method for preparing PTT polyester comprising following steps:

(1). Esterification reaction: 18 kg refined terephthalic acid (PTA), 8.4 kg 1,3-propylene glycol (PDO) was added into 70 L polyester experimental device, meanwhile 900 g isophthalic acid, 180 g neopentyl glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 5

A method for preparing PTT polyester, comprising following steps:

(1). Esterification reaction: 18 kg refined terephthalic acid (PTA), 8.4 kg 1,3-propylene glycol (PDO) were added into 70 L polyester experimental device, meanwhile 1080 g isophthalic acid, 180 g neopentyl glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 6

A method for preparing PTT polyester, comprising following steps.

(1). Esterification reaction: 18 kg refined terephthalic acid (PTA), 8.4 kg 1,3-propylene glycol (PDO) were added into 70 L polyester experimental device, meanwhile 1260 g isophthalic acid, 180 g neopentyl glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 7

A method for preparing PTT polyester comprising following steps:

(1). Esterification reaction: 18 kg refined terephthalic acid (PTA), 8.4 kg 1,3-propylene glycol (PDO) were added into 70 L polyester experimental device, meanwhile 540 g isophthalic cid, 360 g 1,4-hexahydroterephthalic acid, 135 g neopentyl glycol and 1.8 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa, when polymerization ended, cut a chip to conduct test. Performance index of the chip is indicated in Table 1.

EXAMPLE 8

A method for preparing PTT polyester, comprising following steps:

(1). Esterification reaction: 18 kg refined terephthalic acid (PTA), 8.4 kg 1,3-propylene glycol (PDO) were added into 70 L polyester experimental device, meanwhile 540 g isophthalic acid, 540 g 1,4-hexahydroterephthalic acid, 135 g neopentyl glycol and 1.8 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~20° C. Recovered the pressure to constant level and ended the reaction when there was no water produced from the esterification reaction (2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 9

A method for preparing PTT polyester, comprising following steps:

(1). Esterification reaction: 18 kg refind terephthalic acid (PTA), 8.4 kg 1,3-propylene glycol (PDO) were added into 70 L polyester experimental device, meanwhile 630 g isophthalic acid, 630 g 1,4-hexahydroterephthalic acid, 135 g neopentyl glycol and 1.8 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 10

A method for preparing PTT polyester, comprising following steps:

(1). Esterification reaction: 18 kg refined terephthalic acid (PTA), 8.4 kg 1,3-propylene glycol (PDO) were added into 70 L polyester experimental device, meanwhile 1080 g isophthalic cid, 90 g 1,4-hexahydroterephthalic acid, 180 g neopentyl glycol and 1.8 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction, (2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

Example 11

A method for preparing PTT polyester, comprising following steps:

(1). Esterification reaction: 18 kg refined terephthalic acid (PTA), 8.4 kg 1,3-propylene glycol (PDO) were added into 70 L polyester experimental device, meanwhile 1080 g isophthalic acid, 90 g 1,4-hexahydroterephthalic acid, 270 g 1,2-butylene glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

EXAMPLE 12

A method for preparing PTT polyester, comprising following steps:

(1). Esterification reaction: 18 kg refind terephthalic acid (PTA), 8.4 kg 1,3-propylene glycol (PDO) were added into 70 L polyester experimental device, meanwhile 1080 g isophthalic acid, 90 g 1,4-hexahydroterephthalic acid, 360 g 1,2-butylene glycol and 2.7 g pentaerythritol were added, and prepared esterification catalyst solution (containing effective titanium 45 ppm, effective tin 8 ppm and 10 ppm zinc acetate) was added as well, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa. when polymerization ended, cut a chip to conduct test. Performance index of the chip is indicated in Table 1.

COMPARATIVE EXAMPLE 1

This comparative example provides a method for preparing PTT polyester, which comprises following steps:

(1). Esterification reaction: 18 kg PTA and 84 kg PDO were added into 70 L polyester experimental device, meanwhile 1080 g isophthalic acid, 90 g 1,4-hexahydroterephthalic acid and prepared esterification catalyst solution (containing effective titanium 45 ppm, effective tin 8 ppm and 10 ppm zinc acetate) were added, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa, when polymerization ended, cut a chip to conduct test. Performance index of the chip is indicated in Table 1.

COMPARATIVE EXAMPLE 2

This comparative example provides a conventional method for preparing PTT polyester, which comprises following steps:

(1). Esterification reaction: 18 kg PTA and 8.4 kg PDO were added into 70 L polyester experimental device, and prepared esterification catalyst solution (containing effective titanium 45 ppm, effective tin 8 ppm and 10 ppm zinc acetate) was added, then the temperature was elevated and pressure was increased to 0.3 MPa to carry out the esterification reaction. Esterification temperature was controlled between 220~260° C. Recovered the pressure to constant level and ended the reaction when there was no water produced from the esterification reaction.

(2). Polymerization reaction: polymerization catalyst and stabilizer were added into the reaction system after step (1) at 235° C., after blending for 20 min, the conventional polymerization was carried out with polymerization temperature controlled between 245~278° C. and acuity lower than 40 Pa, when polymerization ended, cut a chip to conduct test. Performance index of the chip is indicated in Table 1.

TABLE 1

| Example | Performance index | | | | | | | |
|---|---|---|---|---|---|---|---|---|
| | intrinsic viscosity (dl/g) | melting point (° C.) | content of Carboxyl end group (mg/KOH g) | Hue B value | Tg (° C.) | The agglomerate particles | boiling water shrinkage (%) | Spinning effect |
| Example 1 | 0.926 | 225 | 12.5 | 4.9 | 42 | Nil | 38.7 | good |
| Example 2 | 0.921 | 222 | 15.0 | 4.3 | 41 | Nil | 41.5 | good |
| Example 3 | 0.922 | 221 | 13.3 | 4.7 | 41 | Nil | 45.4 | good |
| Example 4 | 0.920 | 219 | 14.1 | 5.1 | 40 | Nil | 49.2 | good |
| Example 5 | 0.922 | 218 | 15.0 | 5.2 | 40 | Nil | 50.9 | good |
| Example 6 | 0.917 | 216 | 12.8 | 4.3 | 39 | Nil | 52.8 | good |
| Example 7 | 0.913 | 223 | 13.4 | 3.9 | 40 | Nil | 47.9 | good |
| Example 8 | 0.930 | 221 | 14.1 | 5.0 | 41 | Nil | 48.8 | good |
| Example 9 | 0.916 | 217 | 27.3 | 5.4 | 41 | Nil | 49.3 | good |
| Example 10 | 0.928 | 219 | 12.3 | 4.4 | 40 | Nil | 46.8 | good |
| Example 11 | 0.921 | 218 | 13.8 | 3.8 | 41 | Nil | 48.6 | good |
| Example 12 | 0.915 | 218 | 14.5 | 4.8 | 42 | Nil | 47.9 | good |
| Comparative example 1 | 0.917 | 223 | 13.9 | 4.1 | 41 | Nil | 33.4 | good |
| Comparative example 2 | 0.910 | 229 | 14.8 | 4.6 | 40 | Nil | 7.6 | good |

Refer to Table 1, the melting point of PTT polyesters prepared according to the present invention show a certain decrease as compared with that of the PTT polyester prepared according to conventional process, mainly due to that addition of modifying additives breaks the original macromolecular structure resulting in decrease of intermolecular binding force. On the other hand, decreases of chip glass temperature of the Examples are substantially not big as compared with that of Comparative Examples, mainly due to that addition of modifying additives in itself substantially does not lead to rapid decrease of the glass temperature, especially addition of hexahydroterephthalic acid can attenuate decrease of chip grass temperature effectively. Crystallinity of the chips decrease a bit and amorphous state of modified PTT polyester shows a noticeable increase as compared with pure PTT chip having identical degree of crystallization. Through comparative experiments, good experimental effects are achieved, which signifies that the preparing method is reasonable and has no difficulty in pelletizing.

Polyester chips of Example 1~12 and Comparative Examples 1~2 were processed to prepare 83.3 dtex/36f FAY fiber according to conventional spinning process with selected suitable process parameters. Performance index of fibers are indicated in Table 2.

TABLE 2

Performance index of 83.3 dtex/36f FDY fiber

| Example | line density dtex | line density Deviation rate % | line density unevenness rate CV % | fracture strength cN/dtex | Breaking elongation rate % | Breaking elongation uneven rate CV % | Yarn unevenness rate CV % | boiling water shrinkage (%) | Degree of network per meter | Oil content % |
|---|---|---|---|---|---|---|---|---|---|---|
| Example 1 | 111.0 | 0.15 | 0.56 | 3.01 | 59.8 | 5.59 | 2.01 | 38.7 | 21 | 1.10 |
| Example 2 | 111.3 | 0.27 | 0.47 | 3.04 | 58.1 | 5.82 | 1.89 | 41.5 | 20 | 1.15 |
| Example 3 | 111.1 | 0.37 | 0.36 | 2.99 | 60.8 | 5.64 | 2.08 | 45.4 | 21 | 1.14 |
| Example 4 | 110.9 | −0.13 | 0.40 | 3.10 | 62.8 | 6.01 | 2.02 | 49.2 | 19 | 1.09 |
| Example 5 | 111.6 | 0.47 | 0.38 | 3.07 | 58.6 | 5.47 | 2.00 | 50.9 | 22 | 1.00 |
| Example 6 | 111.4 | 0.35 | 0.52 | 3.03 | 59.4 | 6.09 | 2.06 | 52.8 | 23 | 1.05 |
| Example 7 | 111.3 | 0.47 | 0.55 | 2.97 | 57.8 | 6.54 | 2.12 | 47.9 | 20 | 1.29 |
| Example 8 | 111.2 | 0.15 | 0.46 | 2.81 | 59.8 | 5.79 | 2.07 | 48.8 | 22 | 1.10 |
| Example 9 | 110.7 | 0.27 | 0.47 | 3.05 | 58.1 | 5.60 | 1.99 | 49.3 | 21 | 1.15 |
| Example 10 | 112.1 | 0.37 | 0.39 | 3.10 | 60.8 | 5.74 | 2.08 | 46.8 | 19 | 1.14 |
| Example 11 | 111.5 | 0.43 | 0.40 | 2.98 | 62.8 | 6.18 | 2.14 | 48.6 | 22 | 1.09 |
| Example 12 | 111.0 | −0.23 | 0.45 | 3.01 | 59.3 | 5.92 | 2.02 | 47.9 | 20 | 1.09 |
| Comparative example 1 | 111.4 | 0.47 | 0.58 | 3.04 | 54.6 | 5.57 | 2.03 | 33.4 | 21 | 1.00 |

As testified by spinning test, PTT polyester prepared by the invention has good spinning behavior and spinning stability. Fibers of the Examples have high boiling water shrinkage rate. The shrink property is good, thus can meet application requirements of high shrinkage PTT fiber to spin various fabrics of high density having good use effect, flat and close cloth cover and good softness.

The invention claimed is:

1. A method for preparing a high shrinkage polytrimethylene terephthalate copolyester, comprising the following steps:
   (1) combining raw materials and an esterification catalyst to carry out an esterification reaction at 220° C.-260° C. under a pressure of 0.05-0.30 MPa, wherein the esterification reaction is complete when there is no water produced from the reaction, said raw materials consist essentially of 1,3-propylene glycol, terephthalic acid, a third monomer, a fourth monomer and a fifth monomer, wherein
   the third monomer is selected from the group consisting of isophthalic acid, phthalic acid, 1,4-hexahydroterephthalic acid, or combinations thereof,
   the fourth monomer is a branched aliphatic dihydric alcohol selected from the group consisting of neopentvl glycol, 1,2-butvlene glycol and 2,3-butvlene glycol, and
   the fifth monomer is selected from the group consisting of glycerin, 2-methylglycerin and pentaerythritol, wherein the amount of said 1,3-propylene glycol, terephthalic acid, third monomer, fourth monomer and fifth monomer are used in a molar ratio of carboxyl to hydroxyl of 1:1.16-1.85,
   the amount of said third monomer used is 5%-10.5% of the total weight of said starting raw materials,
   the amount of said fourth monomer used is 0.05%-1.0% of the total weight of said starting raw materials,
   and the amount of said fifth monomer used is 50 ppm -600 ppm based on the total weight of said starting raw materials,
   (2) adding a polymerization catalyst and optional additives after step (1) and carrying out a polymerization reaction at 240° C. - 280° C. to yield a high shrinkage polytrimethylene terephthalate copolyester, wherein the boiling water shrinkage rate of the high shrinkage polytrimethylene terephthalate copolyester is 38.7% - 52.8%.

2. The method of claim 1, wherein the fifth monomer is pentaerythritol.

3. The method of claim 1, wherein the esterification catalyst is selected from the group consisting of titanate, TiO2/SiO2, catalyst of organic tin series and zinc acetate.

4. The method of claim 1, wherein the polymerization catalyst is a mixture of titanate and antimony acetate.

5. The method of claim 1, wherein the additive is selected from the group consisting of heat stabilizer, thermal oxidative stabilizer and toner.

6. A high shrinkage polytrimethylene terephthalate Copolyester, product made by the process comprising:
   reacting a first monomer comprising terephthalic acid, a second monomer comprising 1,3-propylene glycol, a third monomer, a fourth monomer and a fifth monomer, wherein
   the third monomer is selected from the group consisting of isophthalic acid, 1,4-hexahvdroterephthalic acid, phthalic acid, or combinations thereof,
   the fourth monomer is a branched aliphatic dihydric alcohol selected from the group consisting of neopentvl glycol, 1,2-butvlene glycol and 2,3-butvlene glycol, and
   the fifth monomer is selected from the group consisting of glycerin, 2-methylglycerin and pentaerythritol, wherein the amount of said 1,3-propylene glycol, terephthalic acid, third monomer, fourth monomer and fifth monomer are used in a molar ratio of carboxyl to hydroxyl of 1:1.16 - 1.85, in the presence of an esterification catalyst at a temperature of between 220° C. - 260° C. and under pressure of 0.05-0.30MPa to form a first esterified product; and adding a polymerization catalyst to said esterified product at 240° C. -280° C. to yield a high shrinkage polytrimethylene terephthalate,
   wherein the amount of said third monomer used is 5% - 10.5% of the total weight of said starting raw materials, the amount of said fourth monomer used is 0.05% - 1.0% of the total weight of said starting raw materials, and the amount of said fifth monomer used is 50 ppm-600 ppm based on the total weight of said raw materials,
   wherein the boiling water shrinkage rate of the high shrinkage polytrimethylene terephthalate copolyester is 38.7% - 52.8%.

7. The product of claim 6, wherein the fifth monomer is pentaerythritol.

* * * * *